(12) United States Patent
Eun et al.

(10) Patent No.: US 7,730,305 B2
(45) Date of Patent: Jun. 1, 2010

(54) AUTHENTICATION METHOD FOR LINK PROTECTION IN ETHERNET PASSIVE OPTICAL NETWORK

(75) Inventors: Jee Sook Eun, Chunlabook-do (KR); Tae Whan Yoo, Daejeon (KR); Yool Kwon, Busan (KR); Kyeong Soo Han, Daejeon (KR)

(73) Assignee: Electronics and Telecommunications Research Instutute, Daejeon (KR)

( * ) Notice: Subject to any disclaimer, the term of this patent is extended or adjusted under 35 U.S.C. 154(b) by 1261 days.

(21) Appl. No.: 11/119,246

(22) Filed: Apr. 29, 2005

(65) Prior Publication Data
US 2006/0129814 A1    Jun. 15, 2006

(30) Foreign Application Priority Data
Dec. 10, 2004    (KR) .................... 10-2004-0104347

(51) Int. Cl.
*H04L 9/00* (2006.01)
(52) U.S. Cl. .................. 713/168; 713/181; 713/170; 713/160; 713/161; 713/162; 380/28; 380/37; 380/44; 380/46; 380/262; 380/256; 370/389
(58) Field of Classification Search ............ 713/168, 713/181, 170, 160–162; 380/262, 256, 37, 380/28, 44, 46; 370/389
See application file for complete search history.

(56) References Cited

U.S. PATENT DOCUMENTS

| | | | |
|---|---|---|---|
| 7,275,157 B2 * | 9/2007 | Cam Winget | 713/168 |
| 7,334,127 B2 * | 2/2008 | Struik | 713/168 |
| 7,395,427 B2 * | 7/2008 | Walker | 713/169 |
| 7,480,939 B1 * | 1/2009 | Nessett et al. | 726/22 |
| 2002/0120758 A1 * | 8/2002 | Chang | 709/230 |

(Continued)

FOREIGN PATENT DOCUMENTS

EP    1209847 A1 *    5/2002

(Continued)

OTHER PUBLICATIONS

Roh et al., "Security Model and Authentication Protocol in EPON-based Optical Access Network", 2003, IEEE, pp. 99-102.*

(Continued)

*Primary Examiner*—Kambiz Zand
*Assistant Examiner*—Tongoc Tran
(74) *Attorney, Agent, or Firm*—Blakely, Sokoloff, Taylor & Zafman LLP

(57) ABSTRACT

An authentication method for link protection between an OLT and an ONU newly connected thereto in an EPON, which is implemented in a data link layer to which cryptography is applied. First, an authentication key is distributed to both the OLT and an ONU. The OLT (or ONU) generates first and second random values, generates an authentication request frame containing the random values, and transmits it to the ONU (or OLT). The ONU generates a first hash value according to a hash function using the random values contained in the request frame, and transmits an authentication response frame containing the first hash value to the OLT. The OLT compares the first hash value with a second hash value calculated by it according to the has function using the two random values and an authentication key distributed to it, and transmits an authentication result frame to the ONU.

12 Claims, 6 Drawing Sheets

U.S. PATENT DOCUMENTS

| | | |
|---|---|---|
| 2002/0138554 A1* | 9/2002 | Feigen et al. ............... 709/203 |
| 2002/0150097 A1* | 10/2002 | Yen et al. .................... 370/390 |
| 2003/0072059 A1* | 4/2003 | Thomas et al. .............. 359/167 |
| 2003/0177187 A1* | 9/2003 | Levine et al. ............... 709/205 |
| 2005/0213603 A1* | 9/2005 | Karighattam et al. ....... 370/463 |
| 2005/0254653 A1* | 11/2005 | Potashnik et al. ........... 380/270 |
| 2005/0256975 A1* | 11/2005 | Kaniz et al. ................. 709/250 |
| 2006/0143453 A1* | 6/2006 | Imamoto et al. ............ 713/169 |
| 2006/0171541 A1* | 8/2006 | Horn et al. .................. 380/278 |
| 2008/0247550 A1* | 10/2008 | Kozaki et al. ............... 380/278 |
| 2008/0313282 A1* | 12/2008 | Warila et al. ................ 709/206 |

FOREIGN PATENT DOCUMENTS

| | | | |
|---|---|---|---|
| GB | 2390270 A | * | 12/2003 |
| GB | 2401008 A | * | 10/2004 |
| GB | 2401014 A | * | 10/2004 |
| WO | WO 2006062345 A1 | * | 6/2006 |

OTHER PUBLICATIONS

Krawczyk et al., "HMAC: Keyed-hashing for Message Authentication", Feb. 1997, Network Working Group, pp. 1-11.*

IEEE Draft P802.1X/D11; Standards for Local and Metropolitan Area, Mar. 27, 2001, 147 pages, 2001 IEEE.

* cited by examiner

Octets

| 6 | DA |
| 6 | SA |
| 2 | Length/Type |
| 110 | Data/Pad |
| 4 | FCS |

FIG. 3

Octets

| 6 | DA=01-80-C2-00-00-02[slow-protocol] |
| 6 | SA |
| 2 | Length/Type=88-09 |
| 1 | Subtype(4) |
| 1 | Flag |
| 1 | Code |
| 107 | Data/Pad |
| 4 | FCS |

FIG. 4

AUTHENTICATION METHOD FOR LINK PROTECTION IN ETHERNET PASSIVE OPTICAL NETWORK

RELATED APPLICATION

The present application is based on, and claims priority from, Korean Application Number 2004-104347, filed Dec. 10, 2004, the disclosure of which is incorporated by reference herein in its entirety.

BACKGROUND OF THE INVENTION

1. Field of the Invention

The present invention relates to an authentication method between an Optical Line Terminal (OLT) and an Optical Network Unit (ONU) newly connected thereto in an Ethernet Passive Optical Network (EPON), and more particularly to an authentication method for link protection in the EPON, which can be applied to a data link layer and can support link protection.

2. Description of the Related Art

When a new device attempts to connect to a network, which implements security measures, via a connection point, authentication of the device is performed at the connection point. In order to maintain the security of the network, it is required to check the authenticity of a device newly connecting to the network. The authentication is performed to determine whether or not the device is an authorized entity. After the authentication is performed, cryptography is applied to a link connecting the network connection point and the device based on the authentication information, and then the connection of the device to the secure network is completed so that the device can begin communication via the network.

The authentication is typically performed via an authentication server in the network. The device attempting to connect to the network performs authentication via the authentication server and various authentication protocols. The authentication protocols are typically based on password-based identification, a challenge and response technique, and zero-knowledge proof.

Among the authentication methods, the password-based authentication method is most commonly used. In this method, if a device inputs an ID and a password for its authentication, the authentication server determines whether or not the input ID and password are identical to those stored in the server to determine whether or not the device can access resources requested by the device. The password is secret information of 6 to 8 bytes prescribed between the device and the authentication server. The password must be generated such that it is not easy for attackers to find the password. The password needs to be changed periodically. Typically, the password is transmitted after conversion into a hash value generated by a known hash function. One example of the password-based authentication method uses one-time passwords. This method changes the password each time the device performs authentication. The device sets an initial value $x_0$ as secret information, and calculates $x_i = h(x_{i-1})$ using a known one-way hash function $h(x_i)$, where "i" is an integer in the range of "1" to "n". The device transmits the calculated value $x_{n-1}$ as its password to the authentication server, and the authentication server converts the corresponding password into a hash value to determine whether or not the received value $x_{n-1}$ corresponds to the ID of the device, and updates the corresponding password stored in the authentication server with the received value $x_{n-1}$.

The challenge and response technique is a method in which a device provides its own secret information to the server in order to prove to the server that the device is an authorized user of the server. In this technique, if the server generates a random value and sends a challenge message to the device, the device encrypts the challenge message using a shared key, and sends the encrypted challenge message, together with its identification data, to the server. The server searches for and retrieves the challenge message transmitted to the device on the basis of the identification data received from the device, and encrypts the retrieved challenge message using the shared key and compares it with the challenge message received from the device, thereby authenticating the device.

Finally, the zero-knowledge proof technique is a method in which a device informs the server that the device has its own secret information, without exposing any information about the secret information. This technique is based on an interactive proof scheme in which the device and the server exchange a number of messages corresponding to challenges and responses, where the exchanged messages generally depend on random numbers. For example, in the zero-knowledge proof technique, the authentication server initially selects a number n=pq where "p" and "q" are prime numbers, and stores the prime number "p" and "q" and publicizes the number "n". The device selects a secret number "s" relatively prime to "n" and calculates $v = s^2 \bmod n$, and then registers the value "v" as its public key in the server. The device again selects a random number "r", and generates a value $x = r^2 \bmod n$, and transfers the generated value "x" to the server. The server selects e=0,1 and transmits it to the device. In response to this, the device transmits $y = r \cdot s^e \bmod n$ to the server. The server then determines whether or not $y^2 = x \cdot v^2 \pmod n$. The server accepts the connection of the device to the server if $y^2 = x \cdot v^2 \pmod n$, otherwise it rejects the connection.

As described above, most conventional authentication technologies require an authentication server and thus require techniques for communication and management of servers. This indicates that the conventional authentication technologies incur additional costs for implementing a network.

Since the conventional authentication techniques require communication between the authentication server and the device, the authentication techniques are applied to the network layer, which is different from cryptography techniques that are applied to the data link layer. This applied layer difference causes no problem if the device requires authentication but does not require cryptography. However, in most cases, if authentication is completed, the device is given a key that can be used in cryptography and that is provided to the data link layer. Thus, in the conventional authentication methods, an authentication module must control both frames applied to the data link layer and frames applied to the network layer, because there is a need to provide an interface between the layers. This results in high complexity for a communication protocol and a control technique.

In addition, the conventional authentication methods use one-way authentication techniques to authenticate a device newly connected to a network connection point, so that a process for authentication has an asymmetric structure. Thus, a device newly connected to the network may need to have two processes for the next device to be connected to the network. This causes a waste of resources and requires that a key distribution technique necessary for a device to use cryptography be asymmetric, so that one-way feature is also added to key updating, thereby reducing the flexibility of a key management technique.

SUMMARY OF THE INVENTION

Therefore, the present invention has been made in view of the above problems, and it is an object of the present invention to provide an authentication method between an Optical Line Terminal (OLT) and an Optical Network Unit (ONU) newly connected thereto in an Ethernet Passive Optical Network (EPON), which is implemented for link protection in the EPON in the same layer (i.e., a data link layer) as that to which cryptography is applied.

In accordance with the present invention, the above and other objects can be accomplished by the provision of an authentication method for link protection in an Ethernet Passive Optical Network (EPON) including an Optical Line Terminal (OLT) connected to other network systems and a plurality of Optical Network Units (ONUs) located at a subscriber side of the EPON, the method comprising distributing an authentication key to both the OLT and an ONU in the EPON; generating first and second random values in one of the OLT and the ONU, generating an authentication request frame containing the first and second random values in the one of the OLT and the ONU, and transmitting the authentication request frame from the one of the ONU and OLT to the other thereof; generating a first hash value according to a predetermined function using the first and second random values contained in the authentication request frame in the other of the ONU and OLT, and transmitting an authentication response frame containing the first hash value from the other of the ONU and OLT to the one thereof; and comparing, in the one of the OLT and the ONU, the first hash value contained in the authentication response frame with a second hash value calculated by the one of the OLT and the ONU according to the predetermined function using the first and second random values and an authentication key distributed to the one of the OLT and the ONU, and transmitting an authentication confirmation frame containing an authentication result value indicating a result of the comparison from the one of the OLT and the ONU to the other thereof.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a schematic diagram illustrating a general MAC frame;

FIG. 4 is a schematic diagram illustrating a basic authentication frame structure according to the present invention;

DESCRIPTION OF THE PREFERRED EMBODIMENTS

An authentication method for link protection in an EPON according to the present invention will now be described in detail with reference to the accompanying drawings. In the following description of the present invention, a detailed description of known functions and configurations incorporated herein will be omitted when it may obscure the subject matter of the present invention.

Cryptography is classified into symmetric key cryptography and public key cryptography. The symmetric key cryptography uses the same key for encryption and decryption and the public key cryptography uses different keys for encryption and decryption. The encryption key used in the symmetric cryptography must not be exposed to the network, whereas the encryption key used in the public key cryptography, which is publicized, can be exposed to the network.

Since cryptography and authentication techniques are typically implemented in separate functional modules, the cryptography technique does not always affect the authentication technique. However, if symmetric key cryptography is used in the data link layer, it is possible to simply authenticate a device attempting to connect to a network connection point by confirming a key shared between the device and the network connection point. This not only avoids a complicated process for receiving a certificate from an authentication server, but also eliminates the need for the authentication server. It is also possible to design a simple authentication protocol, replacing the conventional complicated protocols.

Figure 1:
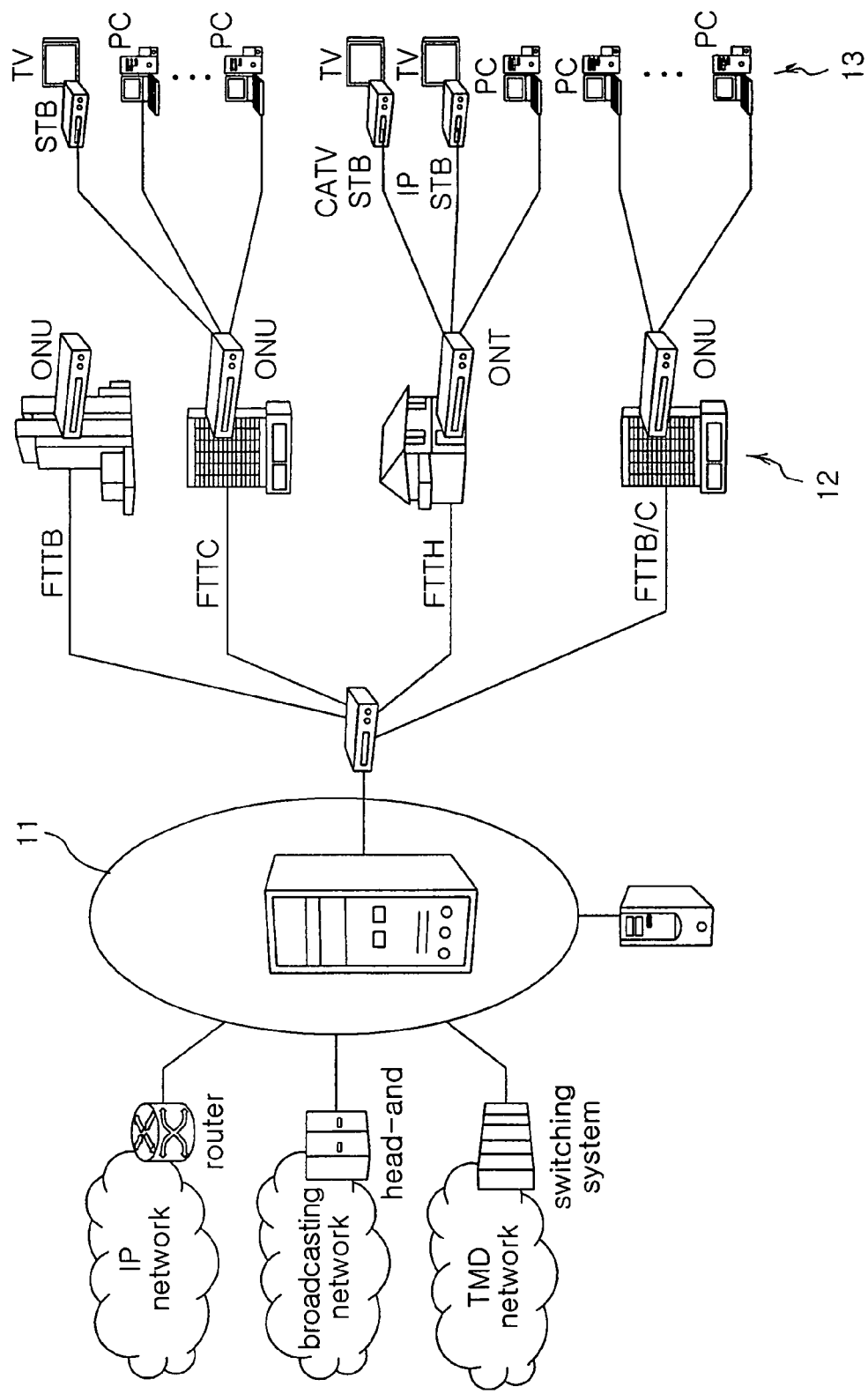
FIG. 1 is a schematic diagram illustrating a general configuration of an Ethernet Passive Optical Network (EPON)

FIG. 1 is a schematic diagram illustrating the configuration of an Ethernet Passive Optical Network (EPON). The EPON includes an Optical Line Terminal (OLT) 11, Optical Network Units (ONUs) 12, and subscriber terminals 13. The OLT 11 connects the optical network to systems of other networks such as an IP network, a broadcasting network, and a TDM network. The ONUs 12 are connected to STBs or PCs, and the subscriber terminals 13 are located on the subscriber end of the optical network.

In the authentication method according to the present invention, the OLT 11 and an ONU 12 in the EPON share a key for authentication between the OLT 11 and the ONU 12. The authentication method comprises a procedure for confirming the shared key without an authentication server, and uses an authentication protocol for confirming the shared key.

In authentication between the OLT 11 and the ONU 12, the security technique is applied only to a single link since cryptography is applied only to the data link layer. If a new device desires to connect to a secure network, the new device is requested to establish a secure channel with a device located at a network connection point. Thereafter, the new device uses only the secure channel established with the device located at the network connection point. Communication between the device located at the network connection point and another device in the network is performed over a secure channel established independently of the devices. Thus, authentication can be performed only through a link established between the device desiring to connect to the network and the device located at the network connection point. Authentication in the EPON is performed between the OLT 11 and the ONU 12.

In the symmetric and public key cryptographies, key length significantly affects the time required to process messages. The length of a symmetric cryptographic key is 128 bytes, whereas the length of a public cryptographic key is 1024 bytes or more. Thus, most security techniques use symmetric cryptography, which has little affect upon communication speed, in encryption of messages. If symmetric cryptography is used in the EPON, authentication can be performed by confirming the key shared between the OLT 11 and the ONU 12. This indicates that an authentication server is not necessary for authentication, and secure communication can be achieved using a simple method of confirming the key shared between the OLT 11 and the ONU 12.

In addition, in the EPON, the OLT 11 and each ONU 12 share a common key called a "master key (MK)", which was distributed when the EPON was established.

The authentication method according to the present invention performs authentication by confirming an authentication key generated from the master key distributed when the EPON is established. Techniques for distributing the master key and generating the authentication key from the master key are not the subject of the present invention.

The technique for generating the authentication key from the master key is based on a key management protocol used in a key management module. The key management protocol is a protocol for managing keys used between the OLT 11 and the ONUs 12 and performing generation, distribution, storage and updating of the keys. The key management protocol uses a hierarchical key structure to generate keys. The master key generates a Pairwise Master Key (PMK), and the PMK then generates an authentication key.

The reason of confirming the authentication key, instead of the master key, for authentication in the present invention is to improve the security of the master key by preventing the master key from being exposed to the channel since the master key is almost invariant.

Figure 2A:
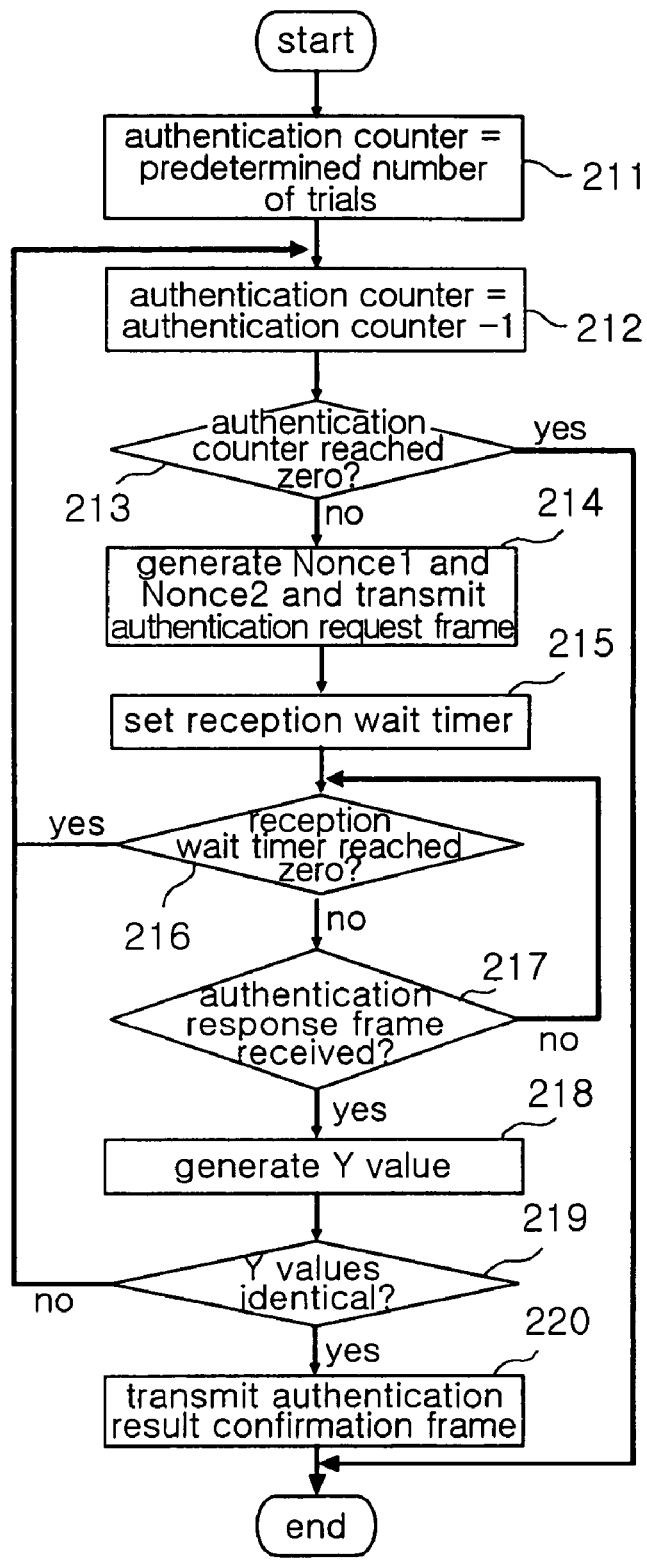
FIGS. 2a and 2b are flow charts illustrating an authentication method for link protection in the EPON according to the present invention.
Figure 2B:
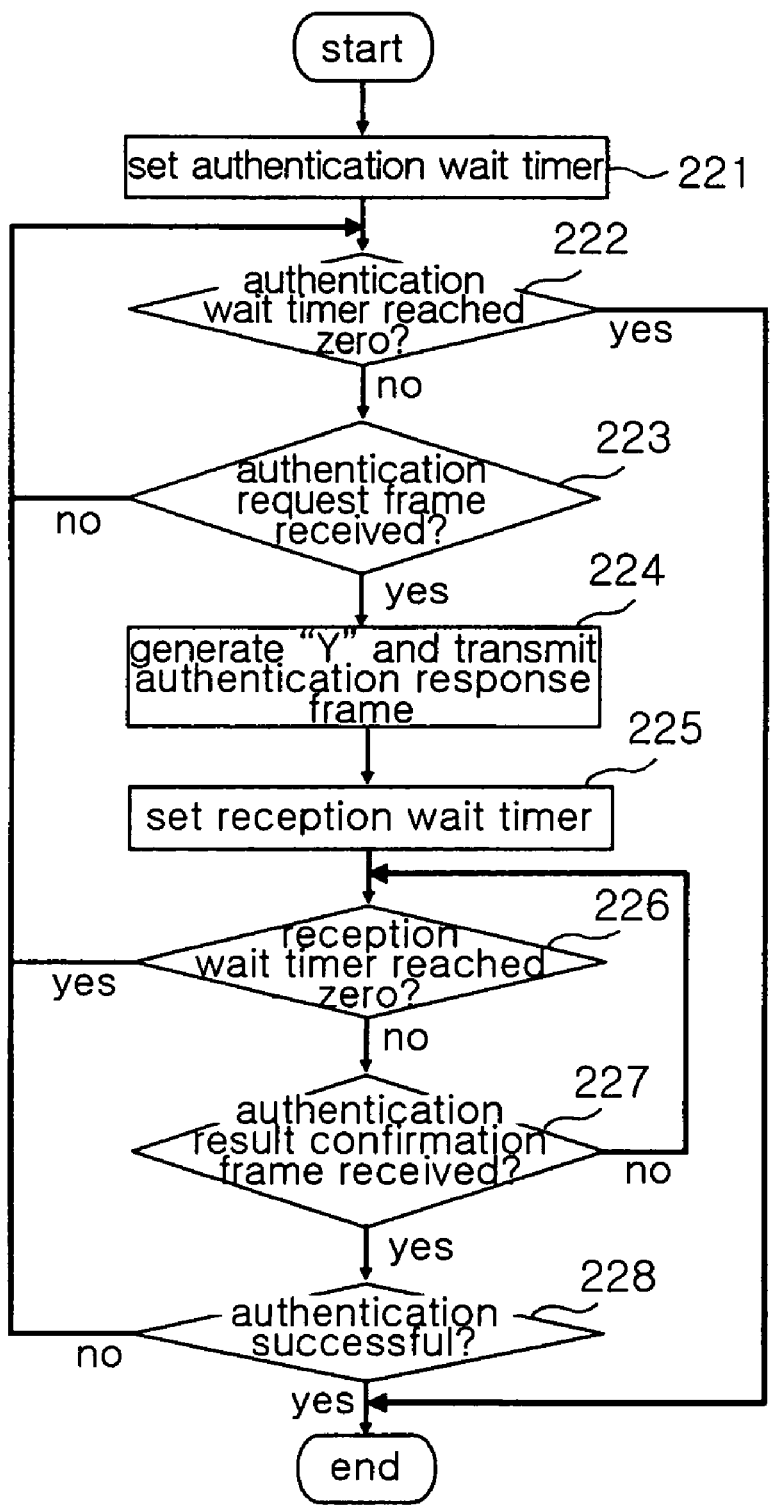

FIGS. 2a and 2b are flow charts illustrating the procedure of an authentication method performed between the OLT 11 and an ONU 12 according to the present invention.

In the case where the OLT 11 authenticates an ONU 12, FIG. 2a shows an authentication procedure performed in the OLT 11, and FIG. 2b shows an authentication procedure performed in the ONU 12. Conversely, in the case where an ONU 12 authenticates the OLT 11, FIG. 2a shows an authentication procedure performed in the ONU 12, and FIG. 2b shows an authentication procedure performed in the OLT 11.

If an authentication key (AK) is produced according to a key management protocol in the EPON as described above, the OLT 11 and the ONU 12 are assigned the same authentication key (AK). The authentication key is generated from a Pairwise Master Key (PMK) generated from the master key. A general key generation protocol can be used to generate the authentication key. In the case where cryptography is not used, the master key is used as the authentication key since no PMK is distributed or generated from the master key.

The present invention is based on confirmation of the authentication key distributed through the key management protocol. Here, the present invention uses a Pseudo Random Function (PRF), which is a well-known hash function, as an authentication algorithm.

The PRF converts an input bit string "x" having a limited length into an output bit string "H(x)" having a fixed length. The PRF is advantageous in that it is easy to calculate "H(x)", given "H" and "x". It is computationally impossible for the PRF to calculate an input value, given an output value, and also to find another input providing the same output, given an input. Further, it is computationally impossible for the PRF to find two different input messages providing the same output.

If an output value more than 160 bits is used with the one-way feature and collision avoidance of the PRF, high security is achieved since it is difficult to find the key value even through a brute-force attack that tries all possible values in calculation to find the key value. Attackers must perform more than $2^{80}$ trials on average to find the authentication key from the calculation results.

Generation of a value "Y" using the PRF can be expressed by Equation 1.

$$Y=PRF(\text{Nonce1}\|\text{Nonce2}\|AK), \qquad \text{[Equation 1]}$$

where "Nonce1" and "Nonce2" are first and second random (16-byte) values generated in the OLT 11.

The authentication method according to the present invention will now be described with reference to an example in which the OLT 11 authenticates an ONU 12. The same authentication method is applied when the ONU 12 authenticates the OLT 11, except that the OLT 11 and the ONU 12 reverse roles, which will be easily understood by the following description.

As shown in FIG. 2a, if a new ONU 12 is connected to the OLT 11 and thus it is necessary to authenticate the new ONU 12, the OLT 11 generates first and second random values (for example, 16-byte values) "Nonce1" and "Nonce2", and transmits an authentication request frame containing the generated random values to the ONU 12 (214). The OLT 11 substitutes the generated first and second random values and the distributed authentication key into Equation 1 to calculate a value "Y" corresponding to the first and second random values, and stores the calculated value "Y", and then awaits the arrival of a response frame in response to the authentication request (217).

As shown in FIG. 2b, if the ONU 12 receives the authentication request frame from the OLT 11 (223), the ONU 12 substitutes the first and second random values "Nonce1" and "Nonce2" received within the authentication request frame and an authentication key distributed to the ONU 12 into Equation 1 to calculate a value "Y", and transmits an authentication response frame containing the calculated value "Y" to the OLT 11 (224).

As shown in FIG. 2a, when receiving the authentication response frame, the OLT 11 compares the value "Y", which is calculated by substituting the authentication key stored in the OLT 11 and the first and second random values "Nonce1" and "Nonce2" into Equation 1, with the value "Y" contained in the authentication response frame received from the ONU 12 (218). If both values of "Y" are identical, the OLT 11 transmits an authentication confirmation frame to the ONU 12 to accept the authentication (219 and 220).

The ONU 12 receives the authentication confirmation frame (227), and reads the compared result value contained in the authentication confirmation frame to determine whether the authentication is successful or not. If the authentication is successful, the ONU 12 terminates the authentication procedure, and if the authentication is unsuccessful, the ONU 12 repeats the authentication procedure (228).

The authentication method according to the present invention limits the number of times the authentication procedure is repeated, so as to avoid unlimited authentication trials of a device having no authentication process.

As shown in FIG. 2a, the authentication method according to the present invention further includes steps 211, 212 and 213 of checking the number of authentication trials. Specifically, the OLT initializes an authentication trial counter before performing the authentication procedure (211), decreases the authentication trial counter by one each time the authentication procedure is initiated (212), and terminates the authentication procedure if the authentication trial counter reaches zero, i.e., if a predetermined number of authentication trials are performed (213).

After transmitting the authentication frame (214), the OLT 11 sets a response reception wait time (215). If the OLT 11 does not receive an authentication response frame from the ONU 12 within the reception wait time, the OLT 11 returns to the above step 212, thereby preventing the authentication procedure from being indefinitely delayed due to response delay.

Similarly, as shown in FIG. 2b, the ONU 12 sets an authentication wait time, which is an appropriate time required to complete the authentication procedure (221), and determines that the authentication has failed if the set authentication wait time has elapsed, and terminates the procedure (222), thereby preventing delay due to a lengthy authentication procedure. After transmitting the authentication response frame (224), the ONU 12 sets a response wait time (225). If the ONU 12 receives no authentication confirmation frame from the OLT 11 even when the reception wait time has elapsed, the ONU 12 returns to step 222 to receive a new authentication request frame, instead of indefinitely awaiting the receipt of the authentication confirmation frame, thereby preventing the authentication procedure from being continued indefinitely.

As described above, in the authentication method according to the present invention, various types of authentication messages are exchanged between the OLT 11 and the ONU 12 while the authentication is being performed. Contents of the messages used in such an authentication protocol must not be vulnerable to masquerade attack.

If the OLT 11 sends an authentication request message to the ONU 11 in order to confirm an authentication key of the ONU 12, the ONU 12 sends an authentication response message to the OLT 11. Only one correct authentication response message exists for each authentication request message. Thus, an attacker may store pairs of authentication request and response messages and send a corresponding response message to the OLT 11 if the OLT 11 sends the same request message as stored in the attacker to the ONU 11, so that the attacker masquerades as the ONU 11. In order to prevent this, all authentication request messages transmitted from the OLT 11 must contain different content, and all corresponding response messages must also contain different content.

To overcome the above problem, in the prevent invention, the OLT 11 uses unique pairs of first and second random values "Nonce1" and "Nonce2" when producing authentication request frames to be transmitted to the ONU 12, thereby defending against masquerade attacks. Accordingly, all hash values "Y" of corresponding response messages transmitted from the ONU 12 to the OLT 11 are different. In the authentication method according to the present invention, the authentication key is generated using the master key distributed to the OLT 11 and the ONU 12, so that the authentication key is updated each time the PMK is updated through the key distribution protocol, thereby achieving very high security.

In addition, the authentication method according to the present invention does not need to encrypt messages that are exchanged for authentication between the OLT 11 and the ONU 12. This is because the contents of each message exchanged between the OLT 11 and the ONU 12 are changed in every exchange so that the security of messages exchanged therebetween is high.

Another reason why there is no need to encrypt messages exchanged between the OLT 11 and the ONU 12 is that it is not easy for attackers to find the authentication key from among factors required to obtain the hash value "Y". Attackers cannot produce an authentication key distributed to the OLT 11 and the ONU 12 since the authentication key is produced from a Pairwise Master Key (PMK) that is not exposed to communication channels. Attackers must find the PMK to find the authentication key. It is computationally impossible for attackers to find the PMK since they needs $2^{80}$ trials to find the PMK. Thus, the authentication key used in the authentication method according to the present invention is secure. Since attackers cannot determine one of the factors to produce the hash value "Y" in Equation 1, the attackers cannot masquerade as the ONU 12 even though the first and second random values transmitted from the OLT 11 to the ONU 12 are publicized.

Further, the authentication method according to the present invention uses key management frames of a key management protocol used in the data link layer.

Generally, the key management protocol defines frames produced and discarded between an OLT 11 and ONUs 12, and uses MAC frames produced and discarded in the EPON in order to transfer needed information between an OLT 11 and ONUs 12.

OAM frames are conventional MAC frames produced and discarded in the EPON. The above key management protocol uses slow protocol frames such as OAM frames.

The authentication method according to the present invention uses a slow protocol as an authentication protocol employing key management frames of the key management protocol.

A general MAC frame used in the data link layer has the frame structure shown in FIG. 3.

The authentication method according to the present invention uses frame structures as shown in FIGS. 4 to 7, which are modifications of the general MAC frame shown in FIG. 3, for authentication frames produced and discarded during the authentication procedure between the OLT 11 and ONU 12.

Figure 5:
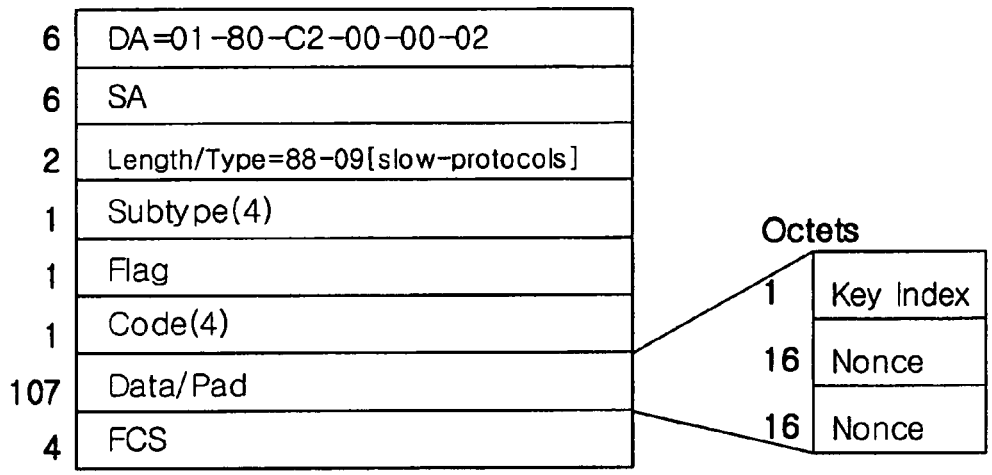
FIG. 5 is a schematic diagram illustrating a frame structure of an authentication request frame according to the present invention.
Figure 6:
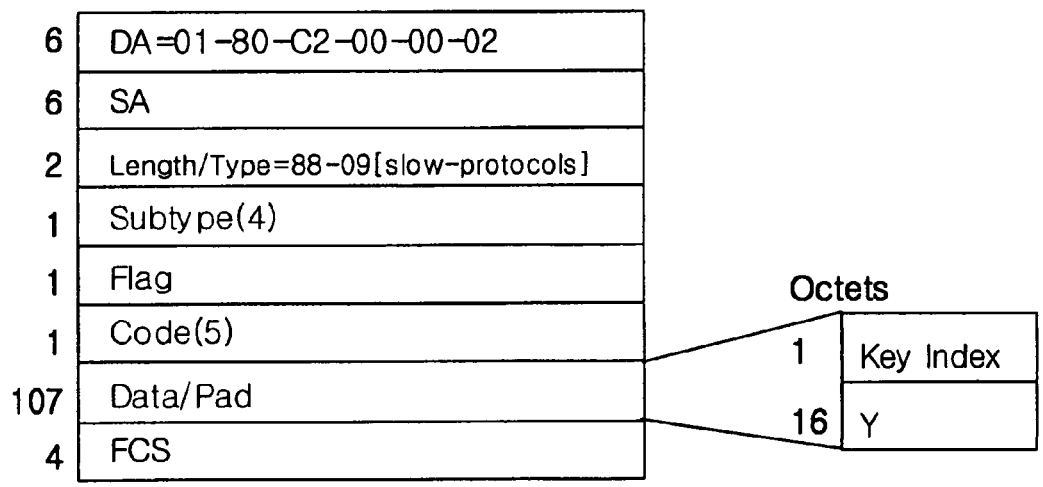
FIG. 6 is a schematic diagram illustrating a frame structure of an authentication response frame according to the present invention.
Figure 7:
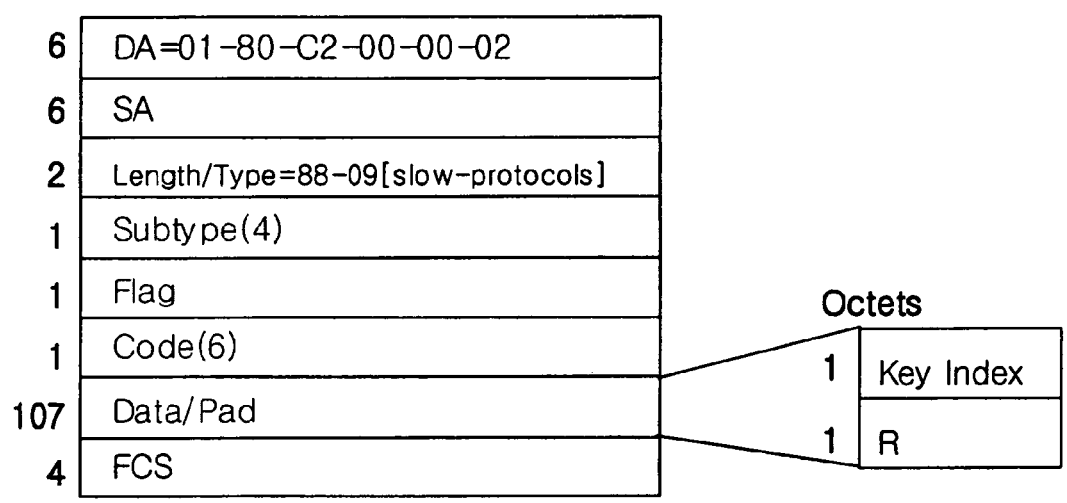
FIG. 7 is a schematic diagram illustrating a frame structure of an authentication confirmation frame according to the present invention.

FIG. 4 shows a basic frame structure of an authentication frame produced and discarded between the OLT 11 and the ONU 12 for implementing the authentication method according to the present invention. FIG. 5 shows a frame structure of an authentication request frame transmitted from the OLT 11 to the ONU 12, which is used to carry the first and second random values. FIG. 6 shows a frame structure of an authentication response frame, which is used to carry a hash value "Y" from the ONU 12 to the OLT 11 in response to the authentication request frame. FIG. 7 shows a frame structure of an authentication confirmation frame, which the OLT transmits to the ONU 12 to inform the ONU 12 whether or not the authentication is accepted, according to the response from the ONU 12.

As shown in FIG. 4, an authentication frame used in the present invention has a 6-byte MAC destination address field (DA), a 6-byte MAC source address field (SA), a 2-byte length/type field (Length/Type), a 1-byte subtype information field (Subtype), a 1-byte flag field (Flag), which is information required by the key management protocol and defines information that must be checked each time a key management frame is transmitted, a 1-byte code field (Code) used to identify the type of authentication frame, a data/pad field (Data/Pad), which has a variable length of up to 107 bytes and is used to define the contents of a message carried within the authentication frame, and a 4-byte frame check sequence field (FCS) used to detect a transmission error within the frame.

The subtype information field, the flag field, and the code field of the authentication frame according to the present invention are constituted using 3 bytes of the 110 bytes allocated to the data/pad field of the conventional MAC frame structure shown in FIG. 3. The data/pad field of the authentication frame is assigned up to 107 bytes.

According to rules of the slow protocol, the MAC destination address field of the authentication frame is assigned a value "01-80-c2-00-00-02", and the length/type field is assigned a value "88-09", and the subtype field is assigned one of the 7 values "4" to "10" (for example, 4), other than conventionally used values "1" to "3". The same is applied to all frames that are exchanged for authentication between the OLT 1 and the ONU 12.

Since the minimum length of the MAC frame is 64 bytes, the data/pad field has a variable length in the range of 43 to 107 bytes. Even if the maximum length of the MAC frame is 1522 bytes, the length of information of the authentication frame can be extended up to 107 bytes since the maximum length of a frame used in the slow protocol is limited to 128 bytes.

The flag field can be filled with "Null" if the authentication is performed without using cryptography, whereas the flag field is filled with values set in the key management protocol if cryptography is used. The function of each bit of the flag field is described in Table 1.

TABLE 1

| Bits | Name | Description |
| --- | --- | --- |
| Bit 0 | Local set done | 0: No encryption module is present or set in local unit<br>1: Encryption module is present or set in local unit |
| Bit 1 | Remote set done | 0: No encryption module is present or set in remote unit<br>1: Encryption module is present or set in remote unit |
| Bit 2 to 7 | Reserved | |

As described in Table 1, set-done bits of the flag field are classified into local and remote set-done bits. In the case where the OLT 11 transmits a key management frame to the ONU 12, the local set-done bit indicates the information of an encryption module of the OLT 11, and the remote set-done bit indicates the information of an encryption module of the ONU 12. If the value of the first or second bit (Bit 0 or Bit 1) is "0", it indicates that no encryption operation is performed because setting is unmatched between both sides or there is no encryption module. When no encryption module is present, the key management module may be present or not. In the case where there is no key management module and in the case where there is no response to a request and there is no key management module, the first and second bits (Bit 0 and Bit 1) are set to "0", and the other bits are filled with "Null". In both cases, the first and second bits are all set to "0" since the encryption module cannot operate normally. If the value of the first or second bit (Bit 0 or Bit 1) is "1", it indicates that there is an encryption module and the encryption module can operate normally since setting is matched between both sides. Accordingly, if the local set-done bit and the remote set-done bit are all set to "1", the encryption modules can operate normally. Every key management frames communicated between the OLT 11 and the ONU 12 includes such a flag field, which is processed as the first information of each frame. The flag field allows the key management modules to quickly take action against a change in the state of the encryption module, which is made while the encryption module is in normal operation with the first and second bits being set to "1". If the local set-done bit or the remote set-done bit is changed to "0", the operation of the encryption module must be stopped. Each time the transmitting side transmits a frame to the receiving side, the transmitting side transfers state information of the encryption module of the receiving side, which is stored in the transmitting side, to the receiving side via a remote set-done bit of the frame. Therefore, based on the frame received from the transmitting side, the receiving side can determine whether or not the transmitting side is properly managing state information of the receiving side.

The 1-byte code field of an authentication frame is used to identify the type of the authentication frame. The types of authentication frames used in the authentication method according to the present invention are classified as shown in Table 2. Since code values "1" and "2" are already in use by other key management frames, other code values "4", "5", and "6", which are not in use, are used to identify the authentication frame type.

TABLE 2

| Code Values | Name | Description |
| --- | --- | --- |
| 4 | Authentication Request Frame | Carry an authentication request containing "Nonce1" and "Nonce2". |
| 5 | Authentication Response Frame | Carry an authentication response containing an output value "Y". corresponding to input values "Nonce1", "Nonce2", and "AK". |
| 6 | Authentication confirmation Frame | Carry an authentication result containing the comparison between "Y" value of the transmitting side and "Y" value of the received frame. |

The structure and function of each of the three types of authentication frames will now be described with reference to FIGS. 5 to 7.

(Authentication Request Frame)

As shown in FIG. 5, an authentication request frame produced at step 214 of FIG. 2 and transmitted to the ONU 12 includes a data/pad field that contains a key index indicating the authentication key, and first and second random values "Nonce1" and "Nonce2" generated to confirm the authentication key. For example, one byte is assigned to the key index value and 16 bytes are assigned to each of the first and second random values "Nonce1" and "Nonce2".

(Authentication Response Frame)

When receiving the authentication request frame described above, the ONU 12 calculates a value "Y" by Equation 1 using first and second random values Nonce1 and Nonce2 contained in the received authentication request frame and an authentication key value distributed to the ONU 12, and transmits an authentication response frame containing the calculated value "Y" to the OLT 11. FIG. 6 shows the structure of the authentication response frame.

As shown in FIG. 6, the authentication response frame includes a data/pad field that contains a key index indicating the authentication key, and the calculated "Y" value.

(Authentication Confirmation Frame)

When receiving the authentication response frame described above, the OLT 11 determines whether or not the "Y" value contained in the received frame is identical to the "Y" value calculated in the OLT 11, and transmits an authentication confirmation frame, which indicates whether or not the authentication is successful, to the ONU 12. FIG. 7 shows the structure of the authentication confirmation frame, which includes a data/pad field that contains a key index indicating the authentication key, and an authentication result value R indicating whether or not the authentication is successful.

The authentication result value "R" has two states "OK", which indicates that both the "Y" values are identical, and "NOK", which indicates that both the "Y" values are not identical. When receiving the authentication confirmation frame shown in FIG. 7, the ONU 12 checks the authentication result value "R" contained in the data/pad field. If the authentication result value "R" is "OK", the ONU 12 begins data transmission. If the authentication result value "R" is "NOK", it indicates that the authentication has failed, and therefore the ONU 12 awaits the arrival of another authentication request frame in order to reattempt the authentication.

Although the above embodiments has been described with reference to the case where the authentication request frame is produced in the OLT 11, the authentication request frame may be produced in the ONU 12, rather than the OLT 11. The authentication request frame may also be produced in both the OLT 11 and the ONU 12 at the same time. This indicates that it is possible for the OLT 11 and the ONU 12 to authenticate each other simultaneously.

As apparent from the above description, the present invention provides an authentication method for link protection in an Ethernet Passive Optical Network (EPON). The authentication method according to the present invention is a network security technique applied to the EPON, which allows an Optical Line Terminal (OLT) and an Optical Network Unit (ONU) in the EPON to authenticate each other through a secure and simple procedure. For example, the authentication method according to the present invention has the following advantages.

First, since the authentication method uses a Pseudo Random Function (PRF) having one-way feature and collision avoidance properties and providing cryptographic security, there is no need to establish a secure channel for authentication, and also no additional functional module for authentication is required.

Second, since the authentication method uses a slow protocol, no key management frame is leaked from the EPON, so that it is not possible to obtain information of frames for authentication outside the EPON, thereby achieving high security. Since the slow protocol limits the number of frames transmittable per second to 10, and limits the frame length to 128 bytes, the authentication method does not affect the amount of traffic in the EPON.

Third, the authentication method performs authentication via three procedures, i.e., authentication request, authentication response, and authentication confirmation. The authentication is performed based on a method of confirming an authentication key. Since information carried within an authentication frame includes simple input and output values according to a simple algorithm, the complexity of a protocol for authentication is reduced. Thus, the authentication procedure can be performed using a relatively simple protocol.

Fourth, since the OLT is implemented to be able to authenticate the ONU without using an authentication server, it requires no authentication server and also requires no protocol for communication with the authentication server.

Fifth, the authentication method according to the present invention uses an authentication protocol having a symmetric structure allowing any one of the OLT and the ONU to request authentication. Because of the symmetric structure, even when an authenticator and an authentication requester reverse roles, no additional process is required for authentication, which is different from the conventional authentication method in which the authenticator and the authentication requester have different processes.

Finally, when it is applied to the data link layer in a general network, the security technology according to the present invention has extensibility such that it can be implemented as a key management protocol, into which a key distribution protocol performed in a key management module is integrated, or alternatively implemented as an independent module using an authentication protocol separated from the key distribution protocol.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An authentication method for link protection in an Ethernet Passive Optical Network (EPON) including an Optical Line Terminal (OLT) connected to other network systems and a plurality of Optical Network Units (ONUs) located at a subscriber side of the EPON, the method comprising steps of:

distributing an authentication key to both the OLT and an ONU in the EPON;

generating first and second random values in one of the OLT and the ONU, generating an authentication request frame containing the first and second random values in the one of the OLT and the ONU, and transmitting the authentication request frame from the one of the ONU and OLT to the other thereof;

generating a first hash value according to a predetermined function using the first and second random values contained in the authentication request frame in the other of the ONU and OLT, and transmitting an authentication response frame containing the first hash value from the other of the ONU and OLT to the one thereof; and comparing, in the one of the OLT and the ONU, the first hash value contained in the authentication response frame with a second hash value calculated by the one of the OLT and the ONU according to the predetermined function using the first and second random values and an authentication key distributed to the one of the OLT and the ONU, and transmitting an authentication confirmation frame containing an authentication result value indicating a result of the comparison from the one of the OLT and the ONU to the other thereof, wherein the steps performed by the ONU and the OLT are interchangeable.

2. The authentication method according to claim 1, wherein the authentication key is generated from a Pairwise Master Key (PMK) according to a key management protocol, the PMK being generated from a master key, the master key being distributed to both the OLT and the ONU when the EPON is established.

3. The authentication method according to claim 1, wherein if cryptography is not used for transmission between the OLT and the ONU, the master key distributed to both the ONU and the OLT when the EPON is established is used as the authentication key.

4. The authentication method according to claim 1, wherein each of the first and second hash values is generated by a Pseudo Random Function (PRF) "Y=PRF(Nonce1∥Nonce2∥AK)", where "Y" denotes the hash value, "Nonce1" denotes the first and second random values, and "AK" denotes the authentication key.

5. The authentication method according to claim 1, wherein each of the authentication request frame, the authentication response frame, and the authentication confirmation frame includes a MAC destination address field, a MAC source address field, a length/type field indicating the length and type of frame, a subtype information field, a flag field used to define information that must be confirmed in the key management protocol each time a key management frame is transmitted, a code field used to determine which one of the authentication request, response, and confirmation frames is the corresponding authentication frame, a data/pad field having a variable length up to 107 bytes and being used to define the contents of a message carried within the authentication frame, and a frame check sequence field defining a value for detecting a transmission error of the frame.

6. The authentication method according to claim 4, wherein each of the hash values includes at least 160 bits.

7. The authentication method according to claim 5, wherein values of the fields of an authentication frame are set according to rules of a slow protocol.

8. The authentication method according to claim 5, wherein the flag field contains local set-done information indicating the information of an encryption module at a transmitting side, and contains remote set-done information indicating the information of an encryption module at a receiving side.

9. The authentication method according to claim 5, wherein the code field has fourth to sixth code values indicating the authentication request frame, the authentication response frame, and the authentication confirmation frame, respectively.

10. The authentication method according to claim 5, wherein the data/pad field of an authentication request frame includes a key index, and first and second random values.

11. The authentication method according to claim 5, wherein the data/pad field of an authentication response frame includes a key index and a hash value.

12. The authentication method according to claim 5, wherein the data/pad field of an authentication confirmation frame includes a key index and information indicating whether or not authentication is successful.

* * * * *